United States Patent
Yamakawa

(10) Patent No.: US 7,742,402 B2
(45) Date of Patent: Jun. 22, 2010

(54) PATH SWITCHING CONTROL SYSTEM, PATH SWITCHING CONTROL METHOD AND COMPUTER SYSTEM USING PATH SWITCHING CONTROL

(75) Inventor: Hiroaki Yamakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 633 days.

(21) Appl. No.: 11/711,832

(22) Filed: Feb. 28, 2007

(65) Prior Publication Data

US 2007/0211622 A1 Sep. 13, 2007

(30) Foreign Application Priority Data

Mar. 1, 2006 (JP) .............................. 2006-54632

(51) Int. Cl.
*H04L 1/00* (2006.01)
(52) U.S. Cl. ..................... 370/220; 370/242; 370/362
(58) Field of Classification Search ................. 370/220, 370/242, 362
See application file for complete search history.

(56) References Cited

U.S. PATENT DOCUMENTS

| 5,721,727 | A | 2/1998 | Ashi et al. | |
| 6,205,562 | B1 * | 3/2001 | Fukushima et al. | 714/43 |
| 2005/0078600 | A1 * | 4/2005 | Rusmisel et al. | 370/217 |
| 2005/0111350 | A1 * | 5/2005 | Kano | 370/216 |
| 2005/0141417 | A1 * | 6/2005 | Huang et al. | 370/229 |
| 2006/0029097 | A1 * | 2/2006 | McGee et al. | 370/468 |
| 2006/0050603 | A1 * | 3/2006 | Chen | 365/233 |
| 2006/0075156 | A1 * | 4/2006 | Okaki et al. | 710/17 |
| 2006/0251419 | A1 * | 11/2006 | Zadikian et al. | 398/51 |
| 2006/0277354 | A1 * | 12/2006 | Tomii | 711/4 |
| 2007/0011587 | A1 * | 1/2007 | Platenberg et al. | 714/774 |
| 2007/0030800 | A1 * | 2/2007 | Hosler et al. | 370/217 |
| 2007/0255430 | A1 * | 11/2007 | Sharma et al. | 700/20 |
| 2008/0262991 | A1 * | 10/2008 | Kapoor et al. | 706/20 |

FOREIGN PATENT DOCUMENTS

JP 10-276205 A 10/1998

* cited by examiner

*Primary Examiner*—Andrew Lee
(74) *Attorney, Agent, or Firm*—Sughrue Mion, PLLC

(57) ABSTRACT

Disclosed is a path switching control system for controlling path switching, including: an active path control unit for controlling active paths; a standby path control unit for controlling standby paths; and a path switching control unit being configured in hardware and for controlling the path switching, wherein the path switching control unit includes: a control information reading unit for reading control information from the active path control unit on the occurrence of a failure in the active path control unit; and a control information writing unit for writing the control information read by the control information reading unit into the standby path control unit. A computer system using the path switching system and a path switching control method are also disclosed.

6 Claims, 4 Drawing Sheets

PATH SWITCHING CONTROL SYSTEM, PATH SWITCHING CONTROL METHOD AND COMPUTER SYSTEM USING PATH SWITCHING CONTROL

BACKGROUND OF THE INVENTION

1. Field of the Invention

The present invention relates to a path switching control system and a path switching control method for controlling switching of paths which connect units (apparatuses). The present invention also relates to a computer system using the path switching control system.

2. Description of the Related Art

In a computer system or a communication system, which includes active paths and standby paths, if the system detects an interface failure on an active path, it generally controls path switching from the active path to the standby path. For example, Japanese Patent Laid-Open Publication No. JP10-276205A describes an ATM communication system in which STM communication equipment controls switching to a standby interface apparatus if a fault occurs in an active interface apparatus. U.S. Pat. No. 5,721,727 discloses a technique for switching to a reserved path if a failure occurs on an active path.

When the system including active paths and standby paths controls the path switching, software processing controls the path switching from an active path which has detected the failure to a standby path. For example, in case of switching from the active path to the standby path due to an interface failure, the path switching is conducted using a software routine for failure management. In this switching, the path which has detected the failure is inactivated and the standby path is activated.

However, the path switching through the software processing wastes processor time and causes access to an interface card by the software. Therefore, it takes a long time to process the switching from the active path to the standby path.

SUMMARY OF THE INVENTION

It is an object of the present invention to provide a path switching control system, a path switching control method and a computer system using the path switching control system which can reduce processing time for the switching from an active path to a standby path.

The present invention provides a path switching control system for controlling path switching, including: an active path control unit for controlling active paths; a standby path control unit for controlling standby paths; and a path switching control unit being configured in hardware and for controlling the path switching, wherein the path switching control unit includes: a control information reading unit for reading control information from the active path control unit on the occurrence of a failure in the active path control unit; and a control information writing unit for writing the control information read by the control information reading unit into the standby path control unit.

Further, the present invention provides a computer system using a path switching control system for controlling path switching, including: an active path control unit for controlling active paths; a standby path control unit for controlling standby paths; and a path switching control unit being configured in hardware and for controlling the path switching, wherein the path switching control unit includes: a control information reading unit for reading control information from the active path control unit on the occurrence of a failure in the active path control unit; and a control information writing unit for writing the control information read by the control information reading unit into the standby path control unit.

Further, the present invention provides a path switching control method of controlling path switching, including the steps of: reading control information from an active path control unit by a path switching control unit configured in hardware when a failure occurs in the active path control unit for controlling active paths; and writing the read control information into a standby path control unit for controlling standby paths by the path switching control unit.

According to the present invention, the path switching control is realized by a path switching control unit configured in hardware. Therefore, fast switching to a substitute standby path can be realized compared to the switching control through the software processing, while dispensing with the path switching control through the software processing. This reduces the processing time for the switching from the active path to the standby path.

According to the present invention, since control information can be migrated from an active path control unit into a standby path control unit, the standby path control unit can conduct the path control after the switching while maintaining a control status before the switching. Therefore, the software on an apparatus connecting to the switched path can keep the communication control before the switching without the need to notice the hardware switching to the substitute path.

BRIEF DESCRIPTION OF THE DRAWINGS

Exemplary features and advantages of the present invention will become apparent from the following detailed description when taken with the accompanying drawings in which.

DETAILED DESCRIPTION OF THE EXEMPLARY EMBODIMENTS

Exemplary embodiments of the present invention will now be described in detail in accordance with the accompanying drawings.

Figure 1:
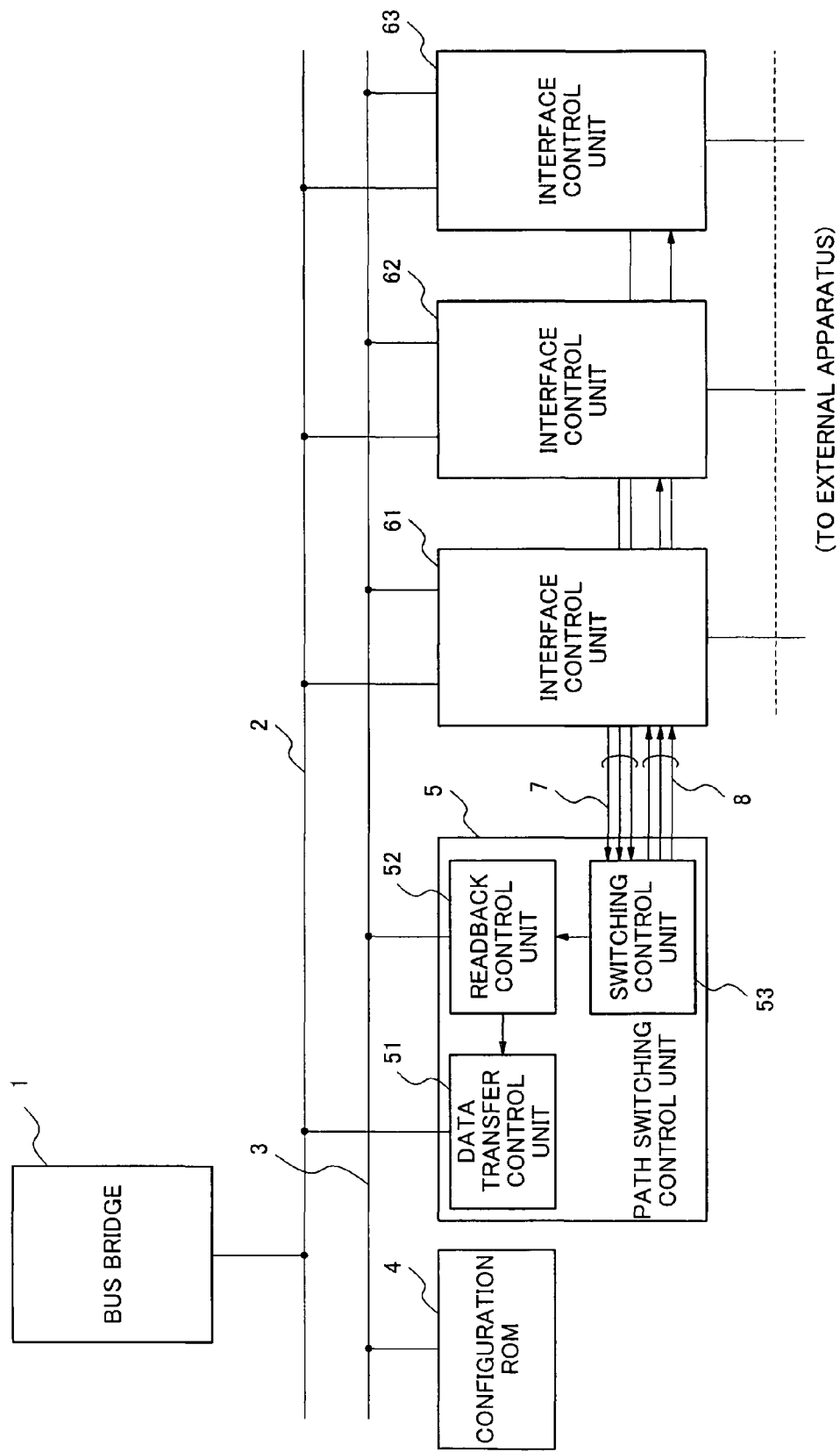
FIG. 1 is a block diagram illustrating the system configuration according to an exemplary embodiment of the present invention.

FIG. 1 is a block diagram illustrating the system configuration according to an exemplary embodiment of the present invention. As shown in FIG. 1, a path switching control system according to the exemplary embodiment of the present invention includes a bus bridge 1, a general bus 2, a configuration bus 3, a configuration ROM 4, a path switching control unit 5 and interface control units 61, 62 and 63. The path switching control unit 5 includes a data transfer control unit 51, a readback control unit 52 and a switching control unit 53.

The bus bridge 1, the path switching control unit 5 and the interface control units 61, 62 and 63 are connected to one another via the general bus 2. The configuration ROM 4, the path switching control unit 5 and the interface control units 61, 62 and 63 are connected to one another via the configuration bus 3.

The above path switching control system applies to, for example, a computer system including a server device or a storage device. For example, the path switching control system according to the exemplary embodiment of the present invention is installed on a server device such as a workstation, a personal computer or a mainframe. The path switching control system controls switching of paths between the server device and the storage device (for example, a magnetic disc device or an optical disc device) or paths among the server devices. The path switching control system can be installed on, for example, a switch or a hub provided in the communication system, for use in controlling the path switching in the communication system.

First, a path switching control operation according to the present invention will be generally described, taking the switching from the interface control unit 61 for controlling active paths to the interface control unit 63 for controlling standby paths for example.

When the interface control unit 61 for controlling active paths detects an interface failure, it outputs a failure detection notification signal to the switching control unit 53 to notify the path switching control unit 5 of the failure. In the path switching control unit 5 which receives the failure notification, the readback control unit 52 reads internal control information from the interface control unit 61, which has notified of the failure, via the configuration bus 3.

The readback control unit 52 transfers the read internal control information to the data transfer control unit 51. The data transfer control unit 51 copies the internal control information into the interface control unit 63 for controlling standby paths via the general bus 2. Upon completion of the migration of the control information from the interface control unit 61 for controlling active paths, which has detected the failure, to the interface control unit 63 for controlling standby paths, the switching control unit 53 deasserts an Enable signal to inactivate the interface control unit 61, which has detected the failure. Then, the switching control unit 53 switches the interface control unit 63 for controlling standby paths to an interface control unit for controlling active paths.

In the path switching control system according to the present invention, the path switching control unit 5, which conducts the switching to a substitute path when an interface failure is detected, is implemented only in hardware. This dispenses with embedded software for the path switching control and so accomplishes reduction of processor time consumption during the path switching.

Also in the present invention, since the path switching control system reads the control information using a readback capability of an FPGA, the path switching control unit 5 can be easily realized by connecting to the general bus 2 and the configuration bus 3 being existing interface.

Next, functions of the components in the path switching control system shown in FIG. 1 will be described. The bus bridge 1 is a bridge for conducting relay among various types of buses. The bus bridge 1 has a function to conduct the relay among the general bus 2, a bus on the upper side to the bus bridge 1 and a bus connecting to a processor or a memory of a server device. The configuration ROM 4 stores configuration data to set configuration (system configuration) for the interface control units 61, 62 and 63.

The interface control units 61, 62 and 63 are blocks (control units) which control interface (i.e., they control paths) to connect to an external apparatus (for example, a server device or a storage device). Namely, in the present invention, the interface control units 61, 62 and 63 function as path control units. Specifically, the interface control units 61, 62 and 63 are realized by means of FPGAs (Field Programmable Gate Arrays) having a readback capability. Although this embodiment refers to the path switching control system including the three interface control units 61, 62 and 63, the number of the interface control units is not limited to three.

The interface control units 61, 62 and 63 load configuration data stored in the configuration ROM 4 via the configuration bus 3, so that the configuration is set. In this embodiment, among the three interface control units 61, 62 and 63, the interface control units 61 and 62 are set as interface control units for controlling active paths, and the interface control unit 63 is set as an interface control unit for controlling standby paths.

The interface control units 61, 62 and 63 have the readback capability. A readback capability is a function to read data stored in a register or a memory within the FPGA. In this embodiment, the readback control unit 52 in the path switching control unit 5 reads control information in the FPGA via the configuration bus 3 using such a readback capability.

The interface control units 61, 62 and 63 have a function to output a failure detection notification signal to notify of the fact that they have detected the occurrence of a failure to the path switching control unit 5 when they detect the occurrence of the failure (for example, a trouble or power failure).

The path switching control unit 5 has a function to control the switching between an interface control unit for controlling active paths and an interface control unit for controlling standby paths on the occurrence of a failure in any of the interface control units 61, 62 and 63. The path switching control unit 5 is specifically realized in a hardware part such as an IC or various types of control circuits. As shown in FIG. 1, the path switching control unit 5 is connected to the interface control units 61, 62 and 63 via the general bus 2 and the configuration bus 3.

The switching control unit 53 in the path switching control unit 5 has a function to receive an input of a failure detection notification signal from the interface control unit 61, 62 or 63 in which the failure has occurred. For example, the switching control unit 53 is connected to the interface control units 61, 62 and 63 by a signal line 7, so that it receives the input of the failure detection notification signal via the signal line 7.

The switching control unit 53 further has a function to output an Enable signal to set each interface control unit 61, 62 or 63 as a path control unit for controlling active paths or standby paths. For example, the switching control unit 53 is connected to the interface control units 61, 62 and 63 by a signal line 8, so that it outputs the Enable signal via the signal line 8.

For example, the switching control unit 53 changes the setting of the interface control units 61, 62 and 63 to make them path control units for controlling active paths, by outputting a high-level signal to the units 61, 62 and 63 via the signal line 8. The switching control unit 53 also changes the setting of the interface control units 61, 62 and 63 to make them path control units for controlling standby paths, by outputting a low-level signal to the units 61, 62 and 63 via the signal line 8.

Hereinafter, "to set an interface control units as a path control unit for controlling active paths by outputting an Enable signal" is also referred to as "to assert an Enable signal". Similarly, "to set an interface control unit as a path control unit for controlling standby paths by outputting an Enable signal" is also referred to as "to deassert an Enable signal". "To set an interface control unit as a path control unit for controlling active paths by asserting an Enable signal" is also referred to as "to put the interface control unit into an active state". Similarly, "to set an interface control unit as a path control unit for controlling standby paths by deasserting an Enable signal" is also referred to as "to put the interface control unit into an inactive state (standby state)".

On the contrary to the above example, the switching control unit 53 can also assert the Enable signal by outputting the low-level signal and deassert the Enable signal by outputting the high-level signal.

The readback control unit 52 has a function to read the control information from the interface control unit 61, 62 or 63 in which a failure has occurred, according to a direction by the switching control unit 53. Namely, in the present invention, the readback control unit 52 functions as a control information reading unit which reads the control information from an active path control unit on the occurrence of the failure. In this embodiment, the readback control unit 52 reads the control information in the interface control unit 61, 62 or 63 via the configuration bus 3 using the FPGA readback capability. For example, the readback control unit 52 reads data stored in a register or a memory within the FPGAs, which configure the interface control units 61, 62 and 63, as the control information.

The data transfer control unit 51 has a function to explicate (analyze) the control information read by the readback control unit 52. For example, the data transfer control unit 51 identifies a data format of the read control information. The data transfer control unit 51 also has a function to transform the read control information based on a protocol used on the general bus 2 according to the analyzed result. For example, the data transfer control unit 51 transforms the control information into the data format used in the protocol on the general bus 2. The data transfer control unit 51 also has a function to write the transformed control information into a standby interface control unit (in this example, the interface control unit 63) via the general bus 2. Namely, in the present invention, the data transfer control unit 51 functions as a control information writing unit which writes the control information into a standby path control unit.

Figure 2:
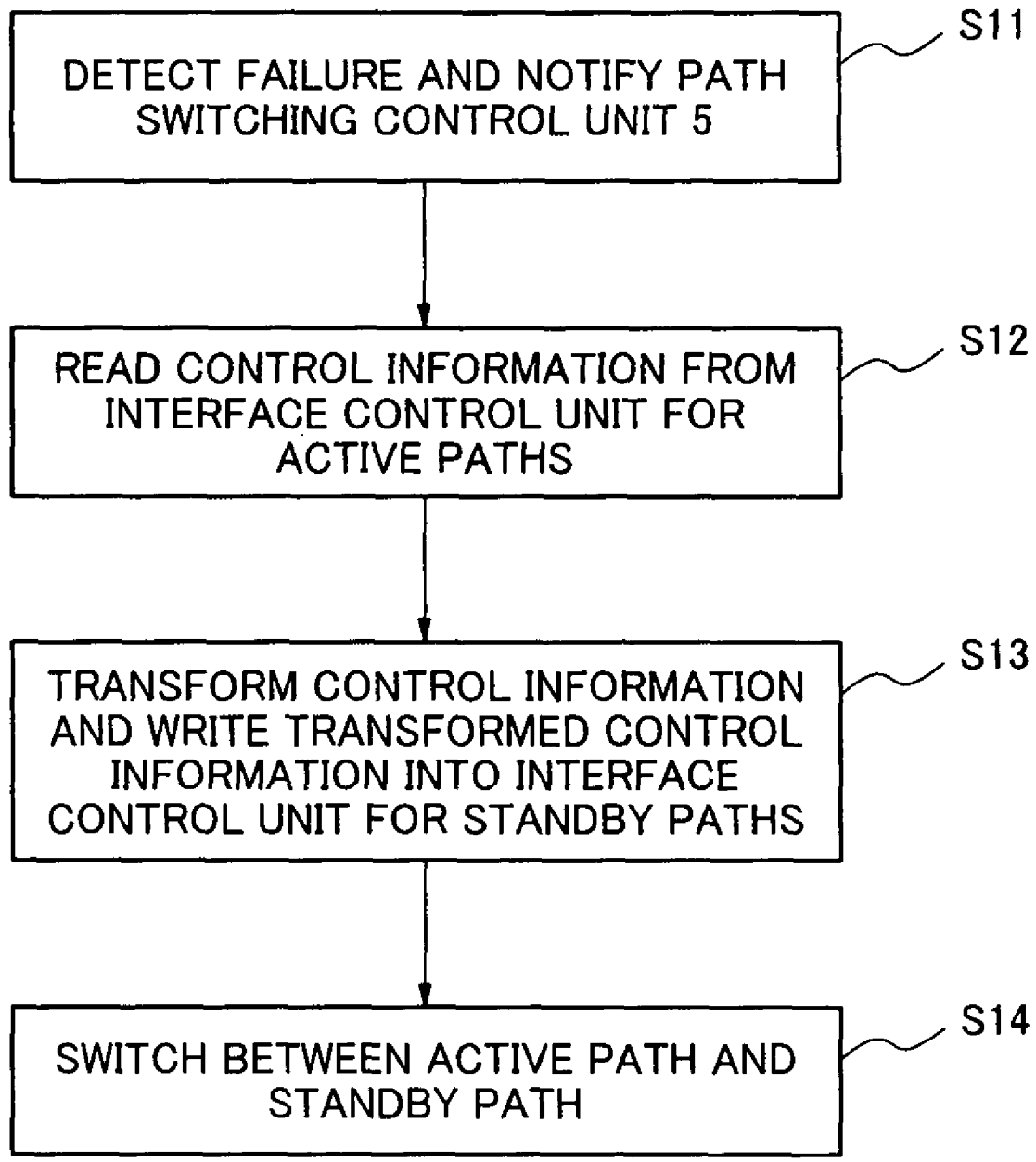
FIG. 2 is a flowchart illustrating a control operation for switching between an interface control unit for controlling active paths and another interface control unit for controlling standby paths when a failure occurs in any of the interface control units, according to the exemplary embodiment of the present invention.
Figure 3:
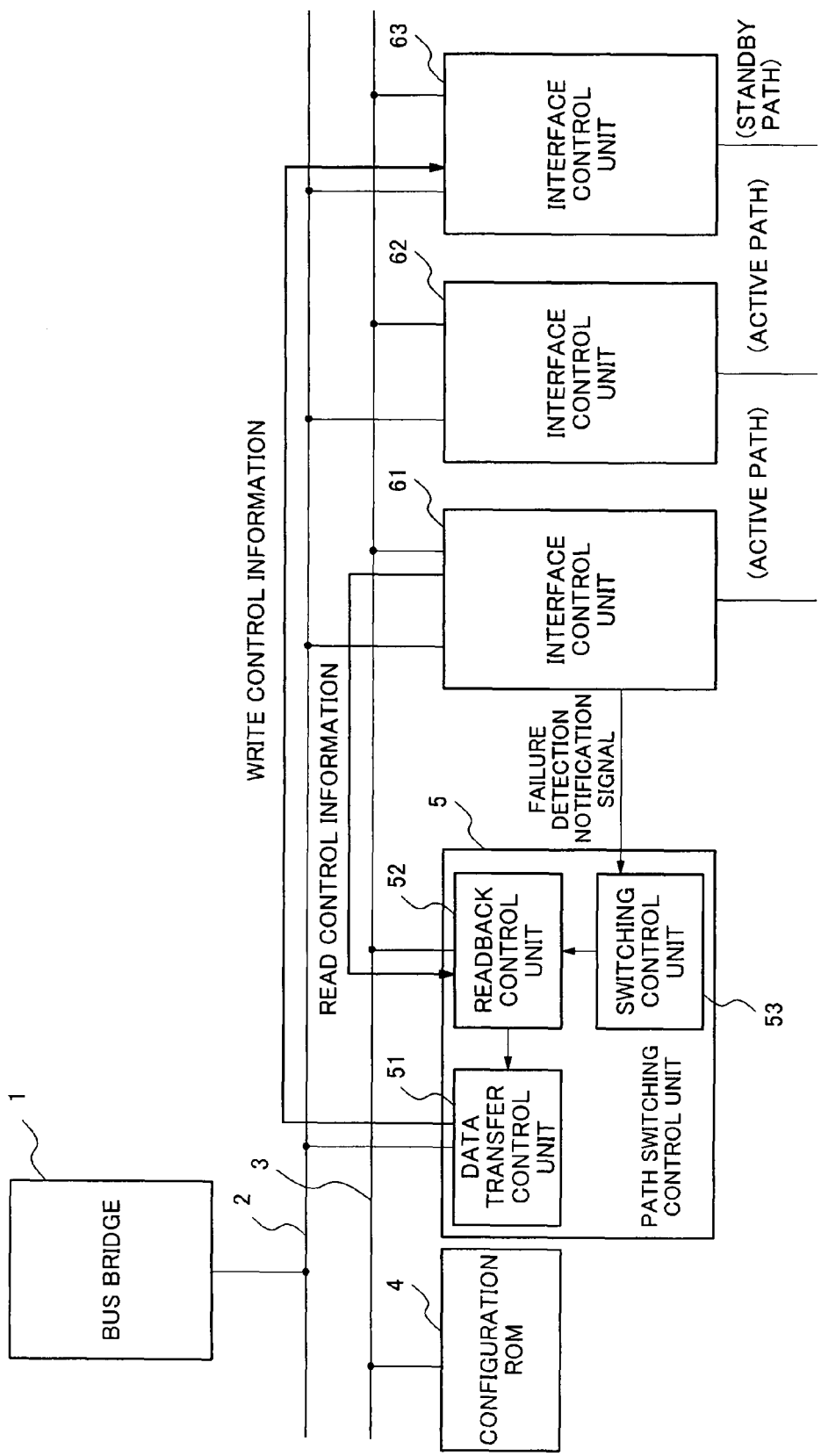
FIG. 3 is a block diagram illustrating the status in which the switching is conducted between the interface control unit for controlling active paths and the other interface control unit for controlling standby paths, according to the exemplary embodiment of the present invention.
Figure 4:
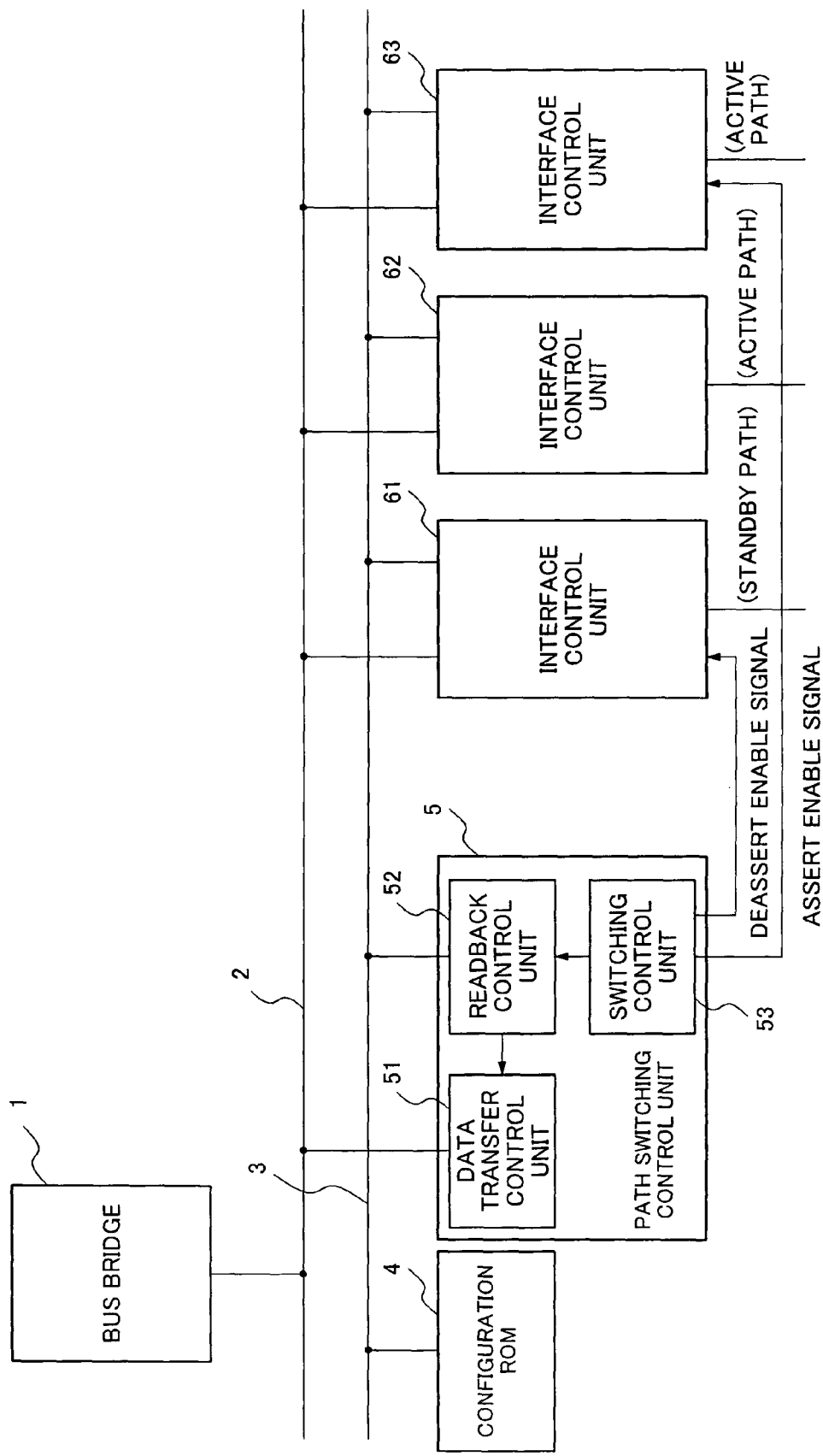
FIG. 4 is a block diagram illustrating the status in which the switching is conducted between the interface control unit for controlling active paths and the other interface control unit for controlling standby paths, according to the exemplary embodiment of the present invention.

Next, an operation according to the exemplary embodiment of the present invention will be described in detail. FIG. 2 is a flowchart illustrating a control operation for switching between an interface control unit (path control unit) controlling active paths and another interface control unit (path control unit) controlling standby paths when a failure occurs in any of the interface control units 61, 62 and 63. FIG. 3 and FIG. 4 are block diagrams illustrating the status in which the switching is conducted between the interface control unit (path control unit) controlling active paths and the other interface control unit (path control unit) controlling standby paths, according to the exemplary embodiment of the present invention.

In this embodiment, among the three interface control units 61, 62 and 63, the interface control units 61 and 62 are assumed to be the path control units for controlling active paths and the interface control unit 63 is assumed to be the path control unit for controlling standby paths, as shown in FIG. 3.

When the active interface control unit 61 detects the occurrence of a failure, it outputs a failure detection notification signal to the switching control unit 53 in the path switching control unit 5 via the signal line 7, as shown in FIG. 3 (step S11 in FIG. 2). When the switching control unit 53 receives an input of the failure detection notification signal from the interface control unit 61, it directs the readback control unit 52 to read control information in the interface control unit 61.

The readback control unit 52 reads the control information from the interface control unit 61 according to the direction by the switching control unit 53 (step S12). At this step, the readback control unit 52 reads the control information from the interface control unit 61 via the configuration bus 3 using the readback capability of the FPGA configuring the interface control unit 61, as shown in FIG. 3. After the readback control unit 52 reads the control information, it transfers the read control information to the data transfer control unit 51.

The data transfer control unit 51 analyzes the control information transferred from the readback control unit 52 and transforms the control information based on the protocol used on the general bus 2. Then, the data transfer control unit 51 writes the transformed control information into the interface control unit 63 for controlling standby paths via the general bus 2, as shown in FIG. 3 (step S13 in FIG. 2).

With the above operation, the control information in the interface control unit 61 for controlling active paths which has detected the failure is migrated into the interface control unit 63 for controlling standby paths.

Upon the completion of the migration of the control information into the interface control unit 63 for controlling standby paths, the switching control unit 53 controls to switch between the interface control unit 61 for controlling active paths and the interface control unit 63 for controlling standby paths (step S14).

Specifically, the switching control unit 53 deasserts an Enable signal to the interface control unit 61 via the signal line 8, as shown in FIG. 4. Namely, the switching control unit 53 sets the interface control unit 61 in which the failure has occurred into an inactive state (standby state). Further, the switching control unit 53 asserts an Enable signal to the interface control unit 63 via the signal line 8, as shown in FIG. 4. Namely, the switching control unit 53 sets the interface control unit 61 into an active state.

As described above, according to this exemplary embodiment, the path switching control is conducted by the path switching control unit 5 configured in a hardware part. This can dispense with the path switching control through software processing. As a result, fast switching to a standby substitute path can be conducted, compared to the switching control through the software processing. Therefore, processing time for the switching from an active path to a standby path can be reduced.

Further, according to this exemplary embodiment, since the control information can be migrated from the active interface control unit 61 (active path control unit) into the standby interface control unit 63 (standby path control unit), the control status before the path switching can be maintained and the interface control unit 63 can conduct the path control after the switching. Therefore, software installed on a server device can keep the communication control before the switching without the need to notice the hardware switching into the substitute path.

Still further, according to this embodiment, the interface control units 61, 62 and 63 are realized in FPGAs. The path switching control unit 5 reads the control information from the interface control unit 61 in which the failure has occurred, using the FPGA readback capability. In this way, the path switching control through the hardware can be easily realized with the FPGA readback capability.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to retain all equivalents of the claimed invention even if the claims are amended during prosecution.

This application is based on Japanese Patent Application No. JP 2006-54632 filed on Mar. 1, 2006, and including a specification, claims, drawings and summary.

What is claimed is:

1. A path switching control system for controlling path switching, comprising:
   an active path control unit for controlling active paths;
   a standby path control unit for controlling standby paths; and
   a path switching control unit being configured in hardware and for controlling the path switching,
   wherein the path switching control unit includes:
   a control information reading unit for reading control information from the active path control unit on the occurrence of a failure in the active path control unit; and
   a control information writing unit for writing the control information read by the control information reading unit into the standby path control unit,
   wherein:
   the active path control unit and the standby path control unit are configured in Field Programmable Gate Arrays;
   the control information reading unit reads the control information from the active path control unit using a readback capability of the Field Programmable Gate Array;
   the path switching control unit is connected to the active path control unit via a configuration bus to set configuration of the active path control unit and the standby path control unit; and
   the control information reading unit reads the control information from the active path control unit via the configuration bus.

2. The path switching control system according to claim 1, wherein:
   the path switching control unit is connected to the standby path control unit via a general bus other than the configuration bus; and
   the control information writing unit transforms the control information read by the control information reading unit based on a protocol used on the general bus, and writes the transformed control information into the standby path control unit via the general bus.

3. A path switching control system for controlling path switching, comprising:
   an active path control unit for controlling active paths;
   a standby path control unit for controlling standby paths; and
   a path switching control unit being configured in hardware and for controlling the path switching,
   wherein the path switching control unit includes:
   a control information reading unit for reading control information from the active path control unit on the occurrence of a failure in the active path control unit; and
   a control information writing unit for writing the control information read by the control information reading unit into the standby path control unit,
   the path switching control unit includes a switching control unit for switching between the active path control unit and the standby path control unit; and
   when the control information writing unit completes the writing of the control information into the standby path control unit, the switching control unit changes setting to set the active path control unit as a path control unit for controlling standby paths, and changes setting to set the standby path control unit as a path control unit for controlling active paths.

4. A path switching control method of controlling path switching, comprising the steps of:
   reading control information from an active path control unit by a path switching control unit configured in hardware when a failure occurs in the active path control unit for controlling active paths;
   writing the read control information into a standby path control unit for controlling standby paths by the path switching control unit; and
   outputting a failure detection notification signal to the path switching control unit by the active path control unit when the active path control unit detects the occurrence of the failure in the active path control unit,
   wherein:
   the step of reading includes reading the control information from the active path control unit, which has outputted the failure detection notification signal, by the path switching control unit;
   the active path control unit and the standby path control unit are configured in Field Programmable Gate Arrays;
   the step of reading includes reading the control information from the active path control unit by the path switching control unit, using a readback capability of the Field Programmable Gate Array;
   the path switching control unit is connected to the active path control unit via a configuration bus to set configuration of the active path control unit and the standby path control unit; and
   the step of reading includes reading the control information from the active path control unit via the configuration bus by the path switching control unit.

5. The path switching control method according to claim 4, wherein:
   the path switching control unit is connected to the standby path control unit via a general bus other than the configuration bus; and
   the step of writing includes transforming the control information read in the step of reading based on a protocol used on the general bus and writing the transformed control information into the standby path control unit via the general bus by the path switching control unit.

6. A path switching control method of controlling path switching, comprising the steps of:
   reading control information from an active path control unit by a path switching control unit configured in hardware when a failure occurs in the active path control unit for controlling active paths;
   writing the read control information into a standby path control unit for controlling standby paths by the path switching control unit; and
   changing setting to set the active path control unit as a path control unit for controlling standby paths, and changing setting to set the standby path control unit as a path control unit for controlling active paths by the path switching control unit, upon completing the writing of the control information into the standby path control unit.

* * * * *